US012576834B2

(12) United States Patent
An et al.

(10) Patent No.: US 12,576,834 B2
(45) Date of Patent: Mar. 17, 2026

(54) VEHICLE AND METHOD OF CONTROLLING THE SAME

(71) Applicants: Hyundai Motor Company, Seoul (KR); Kia Corporation, Seoul (KR)

(72) Inventors: Tae-Geun An, Yeongju-Si (KR); Dae Seok Jeon, Hwaseong-Si (KR); Dong Hyun Sung, Hwaseong-Si (KR); Sangmin Lee, Seoul (KR); Hyoungjong Wi, Seoul (KR); Joon Ho Lee, Seoul (KR); Eungseo Kim, Gwacheon-Si (KR); Yongseok Kwon, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 263 days.

(21) Appl. No.: 18/078,567

(22) Filed: Dec. 9, 2022

(65) Prior Publication Data

US 2023/0219565 A1      Jul. 13, 2023

(30) Foreign Application Priority Data

Jan. 11, 2022      (KR) ........................ 10-2022-0004203

(51) Int. Cl.
B60W 30/09 (2012.01)
B60W 30/095 (2012.01)
B60W 40/12 (2012.01)

(52) U.S. Cl.
CPC ........ B60W 30/09 (2013.01); B60W 30/0956 (2013.01); B60W 40/12 (2013.01); B60W 2420/403 (2013.01); B60W 2420/408 (2024.01)

(58) Field of Classification Search
CPC .. B60W 30/09; B60W 30/0956; B60W 40/12; B60W 2420/408; B60W 2420/403
USPC ......................................................... 701/301
See application file for complete search history.

(56) References Cited

U.S. PATENT DOCUMENTS

| | | | | |
|---|---|---|---|---|
| 11,004,000 | B1 * | 5/2021 | Gutmann .......... | B60W 30/0956 |
| 2018/0001894 | A1 * | 1/2018 | Masui .................. | B60W 10/18 |
| 2020/0086854 | A1 * | 3/2020 | Liu .................... | B60W 30/0956 |
| 2021/0132619 | A1 * | 5/2021 | Refaat ...................... | G06N 3/09 |
| 2023/0015357 | A1 * | 1/2023 | Kim ..................... | G06V 10/751 |

(Continued)

FOREIGN PATENT DOCUMENTS

| | | | | | |
|---|---|---|---|---|---|
| KR | 20100053318 | A | * | 5/2010 | ............. G06V 20/52 |
| KR | 10-2018-0065585 | A | | 6/2018 | |
| KR | 10-2018-0066524 | A | | 6/2018 | |

OTHER PUBLICATIONS

Nengchao Lyu, Vehicle Trajectory Prediction and Cut-In Collision Warning Model in a Connected Vehicle Environment, Sep. 4, 2020, IEEE, IEEE Transactions on Intelligent Transportation Systems ( vol. 23, Issue: 2, Feb. 2022) (Year: 2020).*

*Primary Examiner* — Matthias S Weisfeld
(74) *Attorney, Agent, or Firm* — MORGAN, LEWIS & BOCKIUS LLP

(57)      ABSTRACT

A vehicle includes a camera and radar to detect a target in the external field of view. A controller processes the data to control braking or steering devices. The controller detects a target in an adjacent lane and calculates indexes based on the target's lateral velocity, heading angle, and collision probability. If the indexes meet predetermined values, the controller identifies a cut-in attempt and adjusts avoidance control timing by controlling braking or steering.

14 Claims, 14 Drawing Sheets

(56)          References Cited

U.S. PATENT DOCUMENTS

| 2023/0054608 A1* | 2/2023 | Kuo | ....................... | B60W 10/18 |
|---|---|---|---|---|
| 2023/0102844 A1* | 3/2023 | Kim | ................. | B60W 50/0097 |
| | | | | 701/26 |
| 2024/0166196 A1* | 5/2024 | Liu | ................... | B60W 30/0956 |

* cited by examiner

CENTER POINT OF TARGET

−50%

0%

100%

COLLISION PREDICTION POINT

FIG. 12

| TYPES | | Index | CONTROL |
|---|---|---|---|
| L-① | − | L = 1 | DETECT CUT-IN ATTEMPT OF TARGET AND MAINTAIN CONVENTIONAL AVOIDANCE CONTROL |
| L-② | + | | |
| L-③ | 1 | | |
| L-④ | 1 | | |
| A-① | − | A = 1 | |
| A-② | − | | |
| A-③ | 1 | | |
| C-① | 1 | C = 1 | |
| C-② | 1 | | |
| C-③ | 1 | | |
| C-④ | 1 | | |
| I-① | Case1 | I = Case1 | |

FIG. 14

| TYPES | | Index | CONTROL |
|---|---|---|---|
| L-① | – | L = 1 | DETECT CUT-IN ATTEMPT OF TARGET AND CHANGE CONVENTIONAL AVOIDANCE CONTROL TIMING |
| L-② | + | | |
| L-③ | 1 | | |
| L-④ | 1 | | |
| A-① | – | A = 1 | |
| A-② | – | | |
| A-③ | 1 | | |
| C-① | 1 | C = 1 | |
| C-② | 1 | | |
| C-③ | 1 | | |
| C-④ | 1 | | |
| I-① | Case2 | I = Case2 | |

VEHICLE AND METHOD OF CONTROLLING THE SAME

CROSS-REFERENCE TO RELATED APPLICATION(S)

The present application claims priority to Korean Patent Application No. 10-2022-0004203, filed on Jan. 11, 2022, the entire contents of which is incorporated herein for all purposes by this reference.

BACKGROUND OF THE PRESENT DISCLOSURE

Field of the Present Disclosure

The present disclosure relates to a vehicle and a method of controlling the same, and more particularly, to a vehicle for avoiding cut-in of a target vehicle and a method of controlling the same.

Description of Related Art

In general, vehicles may be provided with an advanced driver assistance system (ADAS) to prevent various collisions with other vehicles while traveling on a road.

Among the types of collisions, so-called cut-in is difficult to prevent only with ADAS that performs a braking control or an avoidance control based on a basic physical quantity because other vehicles invade a driving path of a vehicle from a side in a situation that a driver did not predict.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for effectively avoiding cut-in, and a method of controlling the same.

Additional aspects of the present disclosure will be set forth in part in the description which follows, and in part, will be obvious from the description, or may be learned by practice of the present disclosure.

In accordance with an aspect of the present disclosure, a vehicle include a camera disposed on the vehicle to have an external field of view of the vehicle and configured to obtain image data for detecting a target in the external field of view, a radar disposed on the vehicle to have an external field of view of the vehicle and configured to obtain radar data for detecting the target in the external field of view, and a controller electrically connected to the camera and the radar and including at least one processor configured to process the image data and the radar data, and controlling at least one of a braking device and a steering device based on a result of the processing, wherein the controller is configured to detect the target in a lane adjacent to the vehicle, and obtain a first index based on a lateral velocity of the target, a second index based on a heading angle of the target, and a third index based on a possibility of collision of the vehicle with the target, and when each of the first index, the second index and the third index corresponds to a predetermined output value, determine a cut-in attempt of the target, and control at least one of the braking device and the steering device for adjusting an avoidance control timing for the target.

The controller may be further configured to obtain a collision prediction point which is a center point of the target based on an overall length of the vehicle, and adjust the avoidance control timing according to a location of the collision prediction point.

The controller may be further configured to maintain the avoidance control timing when the collision prediction point is located within the overall length in a first direction with respect to a front of the vehicle, and advance the avoidance control timing when the collision prediction point is located within the overall length in a second direction opposite to the first direction with respect to the front of the vehicle.

The controller may be further configured to determine whether a traveling lane of the target is left+ or right− with respect to the vehicle, determine whether a lateral velocity direction of the target is left+ or right−, and when the value obtained by multiplying the traveling lane of the target and the lateral velocity direction of the target is a negative number, determine the first index as the predetermined output value.

The controller may be further configured to determine the first index as the predetermined output value when a magnitude of the lateral velocity of the target is equal to or greater than a first reference value.

The controller may be further configured to determine whether the traveling lane of the target is left+ or right− with respect to the vehicle, determine whether a heading angle direction of the target with respect to an extension line toward the front of the vehicle is left+ or right−, and when a value obtained by multiplying the traveling lane of the target and the heading angle direction of the target is a positive number, determine the second index as the predetermined output value.

The controller may be further configured to, when at least one of a second plurality of corner points at corners of the target crosses a lane on which the vehicle is traveling and a time (TTIS) at which a first plurality of corner points at the corners of the vehicle enters a lane on which the target is traveling is equal to or less than a second reference value, determine the third index as a predetermined value.

The controller may be further configured to, when a time (TTIT) at which the second plurality of corner points enters a lane on which the vehicle is traveling is equal to or less than a third reference value, determine the third index as the predetermined output value.

The controller may be further configured to, when a time to collision (TTC) between the vehicle and the target is equal to or less than a fourth reference value, determine the third index as the predetermined output value.

The controller may be further configured to, when the collision prediction point does not belong to the overall length in the first direction and the second direction, determine that there is no the cut-in attempt of the target.

In accordance with another aspect of the present disclosure, a method of controlling a vehicle includes detecting a target in a lane adjacent to the vehicle, obtaining a first index based on a lateral velocity of the target, obtaining a second index based on a heading angle of the target, obtaining a third index based on a possibility of collision of the vehicle with the target, recognizing a cut-in attempt of the target when each of the first index, the second index, and the third index corresponds to a predetermined output value, and controlling at least one of a braking device and a steering device of the vehicle to adjust an avoidance control timing for the target.

The method may further include obtaining a collision prediction point which is a center point of the target based on an overall length of the vehicle, and adjusting the avoidance control timing according to a location of the collision prediction point.

The adjusting the avoidance control timing may further include maintaining the avoidance control timing when the collision prediction point is located within the overall length in a first direction with respect to a front of the vehicle, and advancing the avoidance control timing when the collision prediction point is located within the overall length in a second direction opposite to the first direction with respect to the front of the vehicle.

The obtaining the first index based on the lateral velocity of the target may further include determining whether a traveling lane of the target is left+ or right− with respect to the vehicle, determining whether a lateral velocity direction of the target is left+ or right−, and when a value obtained by multiplying the traveling lane of the target and the lateral velocity direction of the target is a negative number, determining the first index as the predetermined output value.

The obtaining the first index based on the lateral velocity of the target may further include determining the first index as the predetermined output value when a magnitude of the lateral velocity of the target is equal to or greater than a first reference value.

The obtaining the second index based on the heading angle of the target may further include determining whether the traveling lane of the target is left+ or right− with respect to the vehicle, determining whether a heading angle direction of the target with respect to an extension line toward the front of the vehicle is left+ or right−, and when a value obtained by multiplying the traveling lane of the target and the heading angle direction of the target is a positive number, determining the second index as the predetermined output value.

The obtaining the third index based on the possibility of collision of the vehicle with the target may further include, when at least one of a second plurality of corner points at corners of the target crosses a lane on which the vehicle is traveling and a time (TTIS) at which a first plurality of corner points at the corners of the vehicle enters a lane on which the target is traveling is equal to or less than a second reference value, determining the third index as a predetermined value.

The obtaining the third index based on the possibility of collision of the vehicle with the target may further include, when a time (TTIT) at which the second plurality of corner points enters a lane on which the vehicle is traveling is equal to or less than a third reference value, determining the third index as the predetermined output value.

The obtaining the third index based on the possibility of collision of the vehicle with the target may further include, when a time to collision (TTC) between the vehicle and the target is equal to or less than a fourth reference value, determining the third index as the predetermined output value.

The method may further include, when the collision prediction point does not belong to the overall length in the first direction and the second direction, determining that there is no the cut-in attempt of the target.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 11 and FIG. 12 show examples in which the avoidance control timing is maintained; and FIG. 13 and FIG. 14 show examples in which the avoidance control timing is changed.

Figure 1:
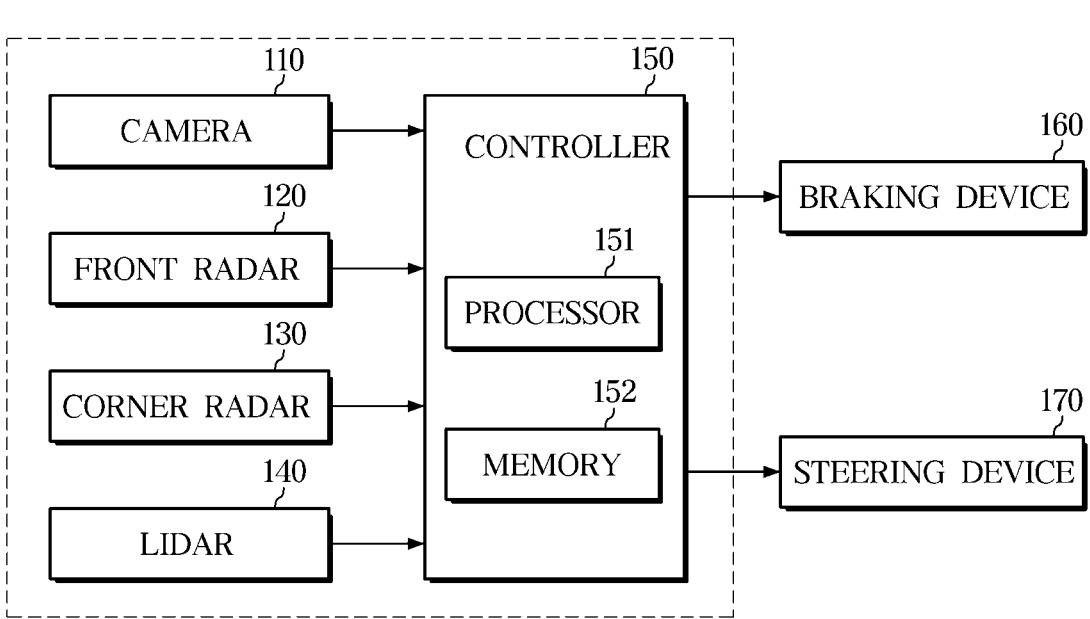
FIG. 1 shows a control block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings, wherein like reference numerals refer to like elements throughout. The present specification does not describe all elements of the disclosed exemplary embodiments and detailed descriptions of what is well known in the art or redundant descriptions on substantially the same configurations have been omitted.

The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various embodiments of the present disclosure will be described in detail with reference to the accompanying drawings.

Figure 2:
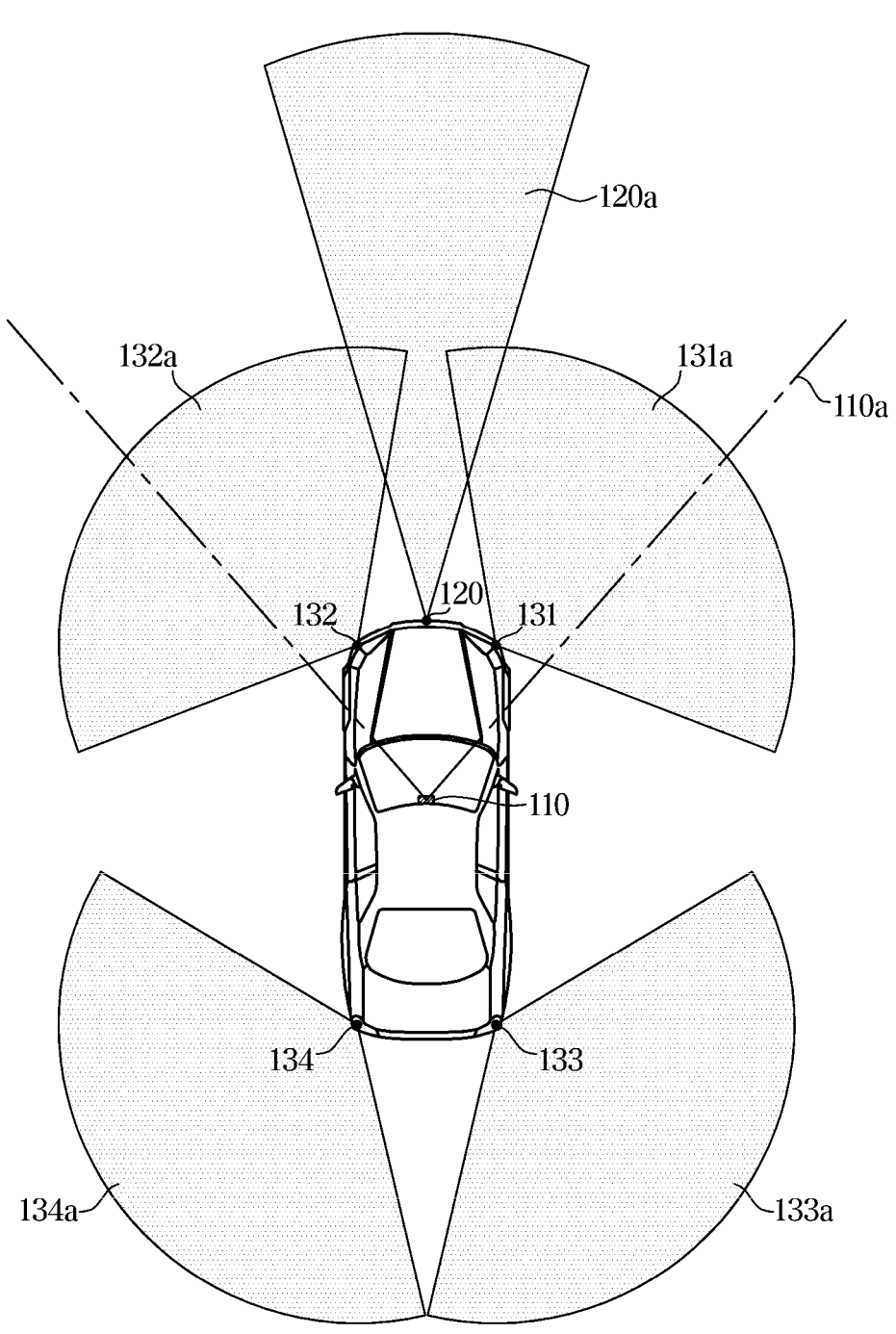
FIG. 2 shows detection areas of a camera and radar included in a vehicle according to an exemplary embodiment of the present disclosure.

FIG. 1 shows a control block diagram of a vehicle according to an exemplary embodiment of the present disclosure, and FIG. 2 shows detection areas of a camera and a radar included in a vehicle according to an exemplary embodiment of the present disclosure.

A vehicle 1 includes a driver assistance system, a braking device 160 and a steering device 170.

The braking device 160 may temporarily brake wheels of the vehicle 1 in response to a driver's intention to brake through a brake pedal and/or a slip of the wheels and/or a data processing result of the driver assistance system.

The steering device 170 may temporarily or continuously control a traveling direction of the vehicle 1 in response to a driver's intention to steer through a steering wheel and/or a data processing result of the driver assistance system.

The driver assistance system (also referred to as an advanced driver assistance system) may assist a driver to operate (driving, braking, and steering) the vehicle 1. For example, the driver assistance system may detect environments around the vehicle 1 (e.g., other vehicles, pedestrians, cyclists, lanes, road signs, etc.), and control driving and/or braking and/or steering of the vehicle 1 in response to the detected environments. Hereinafter, a target includes all other vehicles, cyclists, and the like, which are objects which may collide with a traveling vehicle 1 among the surrounding environments.

A controller 150 may transmit a driving control signal, a braking signal, and a steering signal to the braking device 160 and/or the steering device 170 through communication network for a vehicle (NT).

The driver assistance system may provide various functions to a driver. For example, the driver assistance system may include lane departure warning (LDW), lane keeping assist (LKA), high beam assist (HBA), autonomous emergency braking (AEB), traffic sign recognition (TSR), smart cruise control (SCC), and blind spot detection (BSD).

The driver assistance system may include at least one of a camera 110, a front radar 120, a plurality of corner radars 131, 132, 133 and 134 (130), and a light detection and ranging (LiDAR) 140.

The camera 110 may include a front camera configured for securing a field of view 110a (see FIG. 2) facing in front of the vehicle 1 and a side camera configured for securing a field of view facing a side of the vehicle 1. In the instant case, the front camera may detect a target moving in the front field of view or a target traveling on an adjacent lane in the front and side field of views.

The front camera may be disposed on a front windshield of the vehicle 1. The front camera may photograph in front of the vehicle 1 and obtain image data in front of the vehicle 1. The image data in front of the vehicle 1 may include location information on at least one of other vehicles, pedestrians, cyclists, lanes, curbs, guard rails, street trees, and street lights positioned in front of the vehicle 1.

The side camera may be disposed on a B-pillar side of the vehicle 1. The side camera may obtain image data of the side of the vehicle 1 by photographing the side of the vehicle 1.

In other words, the camera 110 obtains image data, so that the controller 150 processes the image data to detect a target included in the image data, and obtains motion information on the target.

The front radar 120 may have a field of detecting 120a facing in front of the vehicle 1. The front radar 120 may be disposed, for example, on a grille or a bumper of the vehicle 1.

The front radar 120 may include a transmission antenna (or a transmission antenna array) that radiates a transmitted wave toward in front of the vehicle 1, and a reception antenna (or a reception antenna array) that receives a reflected wave reflected by an obstacle.

The front radar 120 may obtain forward radar data from the transmitted wave transmitted by the transmission antenna and the reflected wave received by the reception antenna.

The forward radar data may include position information and speed degree of the target located in front of the vehicle 1, that is, another vehicle or a pedestrian or a cyclist.

The front radar 120 may determine a relative distance to an obstacle based on a phase difference (or time difference) between the transmitted wave and the reflected wave, and determine a relative speed of the obstacle based on a frequency difference between the transmitted wave and the reflected wave. The front radar 120 may transmit the forward radar data to the controller 150.

The plurality of corner radars 130 may include a first corner radar 131 provided on a front right side of the vehicle 1, a second corner radar 132 provided on a front left side of the vehicle 1, a third corner radar 133 provided on a rear right side of the, and a fourth corner radar 134 provided on a rear left side of the vehicle 1.

The first corner radar 131 may have a field of detecting 131a toward the front right side of the vehicle 1. The first corner radar 131 may be disposed on a right side of a front bumper of the vehicle 1.

The second corner radar 132 may have a field of detecting 132a toward the front left side of the vehicle 1, and may be disposed on a left side of the front bumper of the vehicle 1.

The third corner radar 133 may have a d field of detecting 133a toward the rear right of the vehicle 1, and may be disposed on a right side of a rear bumper of the vehicle 1.

The fourth corner radar 134 may have a field of detecting 134a toward the rear left of the vehicle 1, and may be disposed on a left side of the rear bumper of the vehicle 1.

Each of the first, second, third, and fourth corner radars 131, 132, 133, and 134 may include a transmission antenna and a reception antenna.

The first, second, third and fourth corner radars 131, 132, 133 and 134 may obtain first corner radar data, second corner radar data, third corner radar data, and fourth corner radar data, respectively.

The first corner radar data may include distance information and speed degree regarding a target located on the front right of the vehicle 1.

The second corner radar data may include distance information and speed degree regarding a target located on the front left of the vehicle 1.

The third and fourth corner radar data may include distance information and speed information of a target located on the rear right side of the vehicle 1 and the rear left side of the vehicle 1, respectively.

The first, second, third, and fourth corner radars 131, 132, 133, and 134 may transmit the first, second, third, and fourth corner radar data to the controller 150, respectively.

The LiDAR 140 may be provided in the vehicle 1 to have an external view of the vehicle 1. For example, the LiDAR 140 may be mounted on a front bumper, a radiator grille, a hood, a roof, a door, a side mirror, a tailgate, a trunk lid, or a fender.

The controller 150 may process the image data of the camera 110, the front radar data of the front radar 120, and the corner radar data of the plurality of corner radars 130, and generate control signals for controlling the braking device 160 and/or the steering device 170.

The controller 150 may include an image signal processor, which is a processor 151 that processes image data of the camera 110, and/or a digital signal processor that processes radar data of the radars 120 and 130, and/or a micro control unit (MCU) that generates a braking signal.

The controller may recognize a lane of a road by performing image processing when image information (i.e., image data) is received from the camera 110 when an autonomous driving mode is performed, recognize a host lane in which a host vehicle travels based on the recognized position information of the lane, determine whether both adjacent lanes of the host lane are recognized, and control an autonomous driving based on the recognized both lanes upon determining that both lanes are recognized.

The controller 150 identifies the targets in the image based on image information obtained by the camera 110 when a collision avoidance mode is performed, and compares the identified target information with the target information stored in a memory 152, determining whether the targets are obstacles in a fixed state or obstacles in a moving state.

The controller 150 may detect obstacles in front of the vehicle 1 (e.g., other vehicles, pedestrians, cyclists, curbs, guard rails, street trees, street lights, etc.) based on the image data of the camera 110 and the front radar data of the front radar 120.

In addition to the camera 110, the controller 150 may obtain information related to the target based on the LiDAR data of the LiDAR 140.

The memory 152 may store a program and/or data for processing image data, a program and/or data for processing radar data, and a program and/or data for the processor 151 to generate a braking signal and/or warning signal.

The memory 152 may store temporarily the image data received from the front camera 110 and/or the radar data received from the radars 120 and 130, and store temporarily the processing results of the image data and/or radar data of the memory 152.

The memory 152 may be implemented as at least one of a non-volatile memory device such as a cache, a read only memory (ROM), a programmable ROM (PROM), an erasable programmable ROM (EPROM), electrically erasable programmable ROM (EEPROM), and flash memory or RAM, a volatile memory device such as a random access memory (RAM), or a storage medium such as a Hard Disk Drive (HDD), a CD-ROM, but is not limited thereto.

In the above, each configuration for performing the control method according to an exemplary embodiment of the present disclosure and an operation for each configuration have been described. Hereinafter, a control process for detecting a target trying to cut in based on each of the above-described configurations and avoiding the cut-in target will be described.

On the other hand, the present disclosure is to prevent a collision with a target 2 attempting to cut in from an adjacent lane. Conventionally, to avoid a vehicle attempting to cut in, a possibility of collision is determined only based on a time to collision (TTC) between the vehicle 1 and the target 2 and/or a distance to collision (DTC) between the vehicle 1 and the target. However, the conventional method takes a disadvantage in that it shows a sensitive control result depending on a cut-in type or road condition, or does not perform control even if avoidance control is required.

Therefore, unlike the related art, the present disclosure makes it possible to timely avoid an cut-in vehicle according to various indexes reflecting motion information of the target and a new criterion for determining a type of collision.

Prior to describing overall algorithms of the present disclosure, a first index, a second index, and a third index for determining the cut-in target will be described with reference to FIG. 3, FIG. 4, and FIG. 5.

Figure 3:
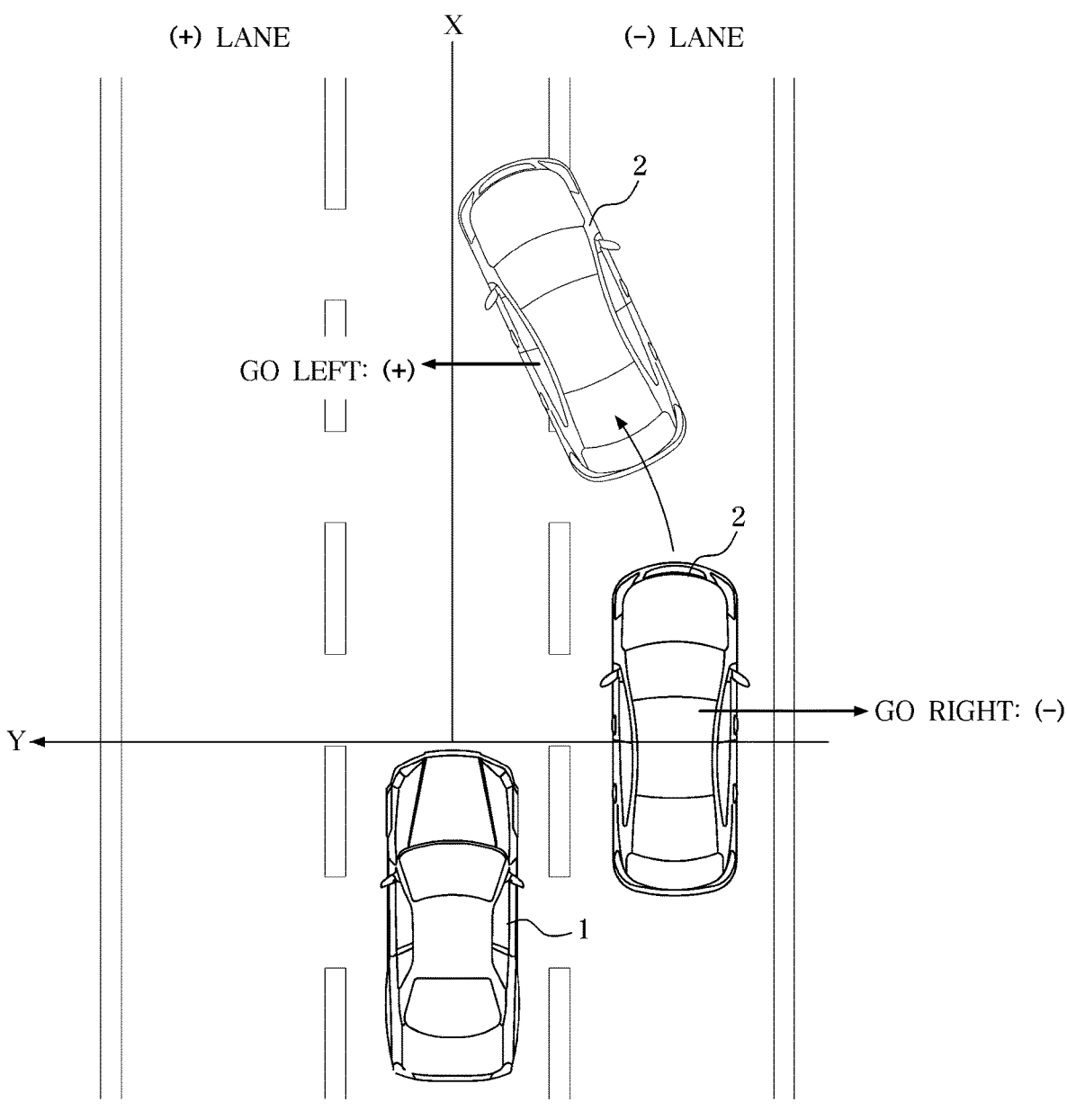
FIG. 3 is a view for explaining a first index based on a lateral velocity of a target.
Figure 4:
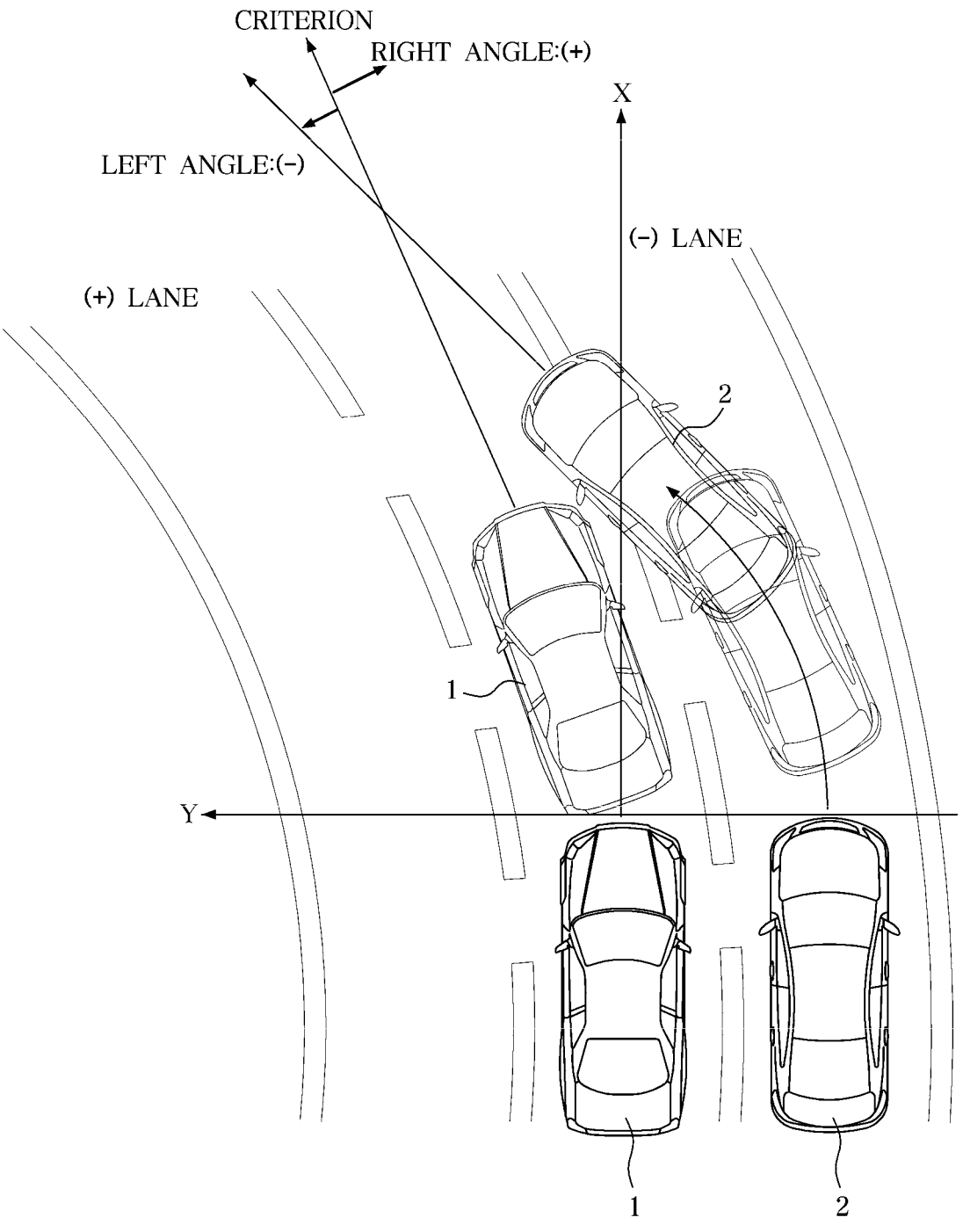
FIG. 4 is a view for describing a second index based on a heading angle of the target.
Figure 5:
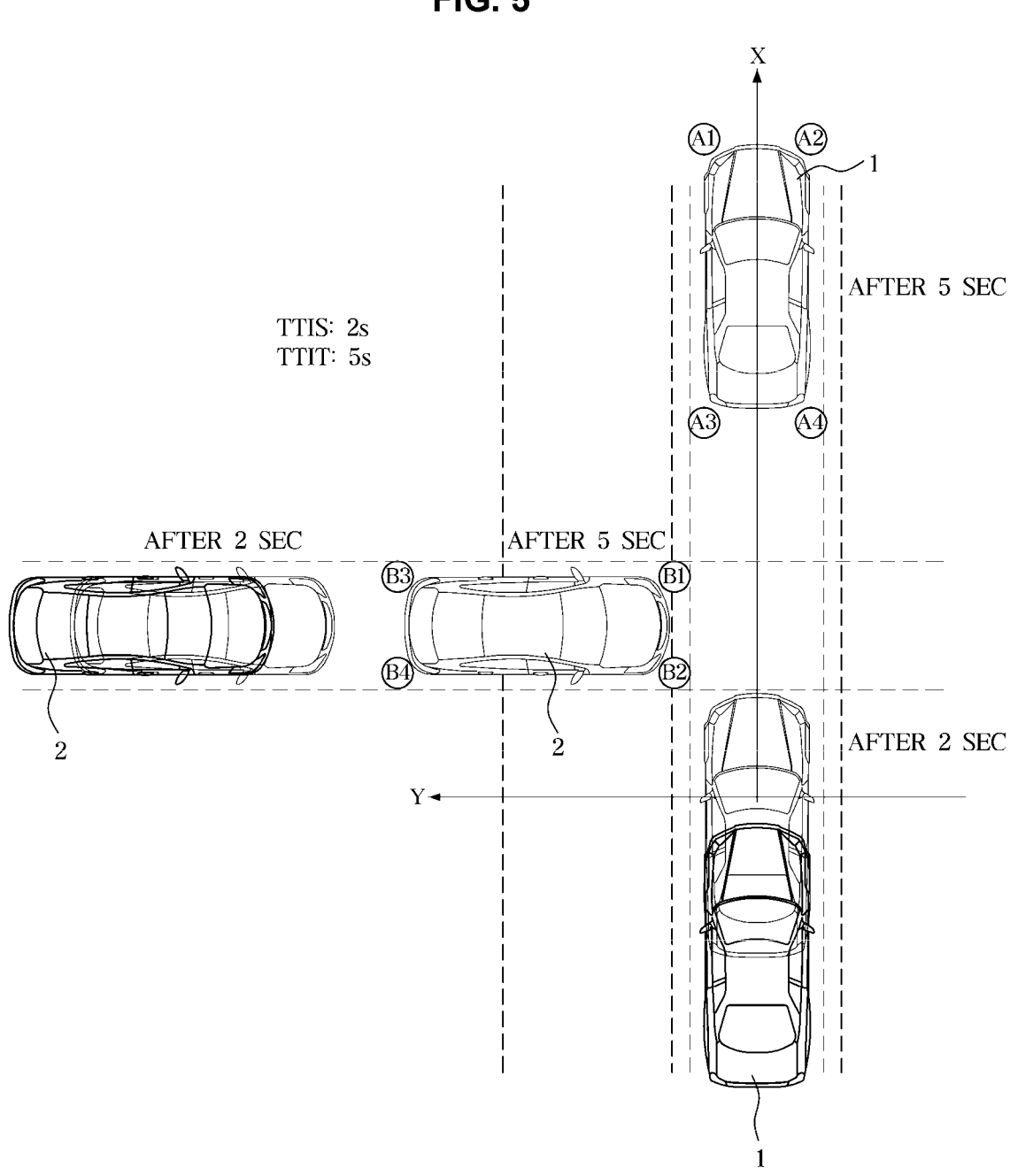
FIG. 5 is a view for explaining a third index based on a possibility of collision of the vehicle with the target.

FIG. 3 is a view for explaining a first index based on a lateral velocity of a target, FIG. 4 is a view for explaining a second index based on a heading angle of the target, and FIG. 5 is a view for explaining a third index based on a possibility of collision of the vehicle with the target.

Referring to FIG. 3, the controller 150 outputs+ when the target 2 is detected from the left with respect to the vehicle 1 being traveled, and – when the target 2 is detected from the right with respect to the vehicle 1.

At the same time, the controller 150 detects a movement of the target 2, and output+ when the target 2 has a lateral velocity component in the left direction with respect to the vehicle 1, and output– when the target 2 has the lateral velocity component in the right direction with respect to the vehicle 1.

Furthermore, the controller 150 detects the movement of the target 2 to obtain a magnitude of the lateral velocity of the target 2 and determine whether the magnitude of the lateral velocity of the target 2 is equal to or greater than a first reference value.

At the present time, when the result of determination between the output code based on the traveling lane of the target 2 and the output code based on the direction of the lateral velocity of the target 2 is a negative number, the controller 150 may determine that the target 2 is close to the vehicle 1. Furthermore, when the result of determination is a negative number and the magnitude of the lateral velocity of the target 2 is equal to or greater than the first reference value, the controller 150 may determine that the possibility of cut-in of the target 2 is very high.

When the result of determination is a negative number and the magnitude of the lateral velocity of the target 2 is equal to or greater than the first reference value, the controller 150 may determine the first index as 1, which is a predetermined output value, and 0 otherwise.

Referring to FIG. 4, the controller 150 may determine a cut-in of the target 2 through a difference between a heading angle of the vehicle 1 and a heading angle of the target 2. To understand this, the controller 150 determines an output value of the second index as follows.

First, the controller 150 outputs+ when the target 2 is detected from the left with respect to the vehicle 1 being traveled, and outputs– when the target 2 is detected from the right with respect to the vehicle 1.

At the same time, the controller 150 sets an imaginary straight line based on an extension line toward the front of the vehicle 1, and outputs – when the heading angle of the target 2 is left based on the imaginary straight line and + when the heading angle of the target 2 is right. The present operation may be applied to the steering angle other than the heading angle.

At the present time, when the result of determination between the output code based on the traveling lane of the target 2 and the output code based on the heading angle of the target 2 is a positive number, the controller 150 may determine that the target 2 approaches the vehicle 1.

When the result of operation is a positive number, the controller 150 may determine the second index as 1, which is a predetermined output value, and 0 otherwise.

Next, the third index will be described with reference to FIG. 5.

In the exemplary embodiment of the present disclosure of the present disclosure, TTIS, TTIT, and TTC are used to determine an output value of the third index.

TTIS is defined as a time at which the vehicle 1 enters a collision zone for the target 2, indicating a time at which a plurality of corner points A1, A2, A3 and A4 at four corners of the vehicle 1 enters a lane on which the target 2 is traveling.

TTIT is defined as a time at which the target 2 enters the collision zone for the vehicle 1, indicating a time at which a plurality of corner points B1, B2, B3 and B4 at the four corners of the target 2 enters a lane on which the vehicle 1 is traveling.

TTC is defined as a time taken until the vehicle 1 and the target 2 collide.

At the present time, the controller 150 determines whether the TTIS is equal to or less than a second reference value, determines whether the TTIT is equal to or less than a third reference value, and determines whether the TTC is equal to or less than a fourth reference value. In the instant case, the second reference value to the fourth reference value (sec) may have various values according to control sensitivity setting.

The controller 150 may determine that the target 2 attempts to cut in by crossing the lane of the vehicle 1, upon determining that at least one of the plurality of corner points B1, B2, B3 and B4 of the target 2 crosses the lane on which the vehicle 1 is traveling, the TTIS is less than or equal to the second reference value, the TTIT is less than or equal to the third reference value, and the TTC is less than or equal to the fourth reference value. Accordingly, when all of the above conditions are satisfied, the controller 150 may determine the third index as 1, which is a predetermined output value, and 0 otherwise.

Meanwhile, a method of determining the output values of the first index, the second index and the third index has been described above. Hereinafter, a series of control process for determining a cut-in attempt of the target 2 based on the first index to the third index and then avoiding the target 2 will be described.

Figure 6:
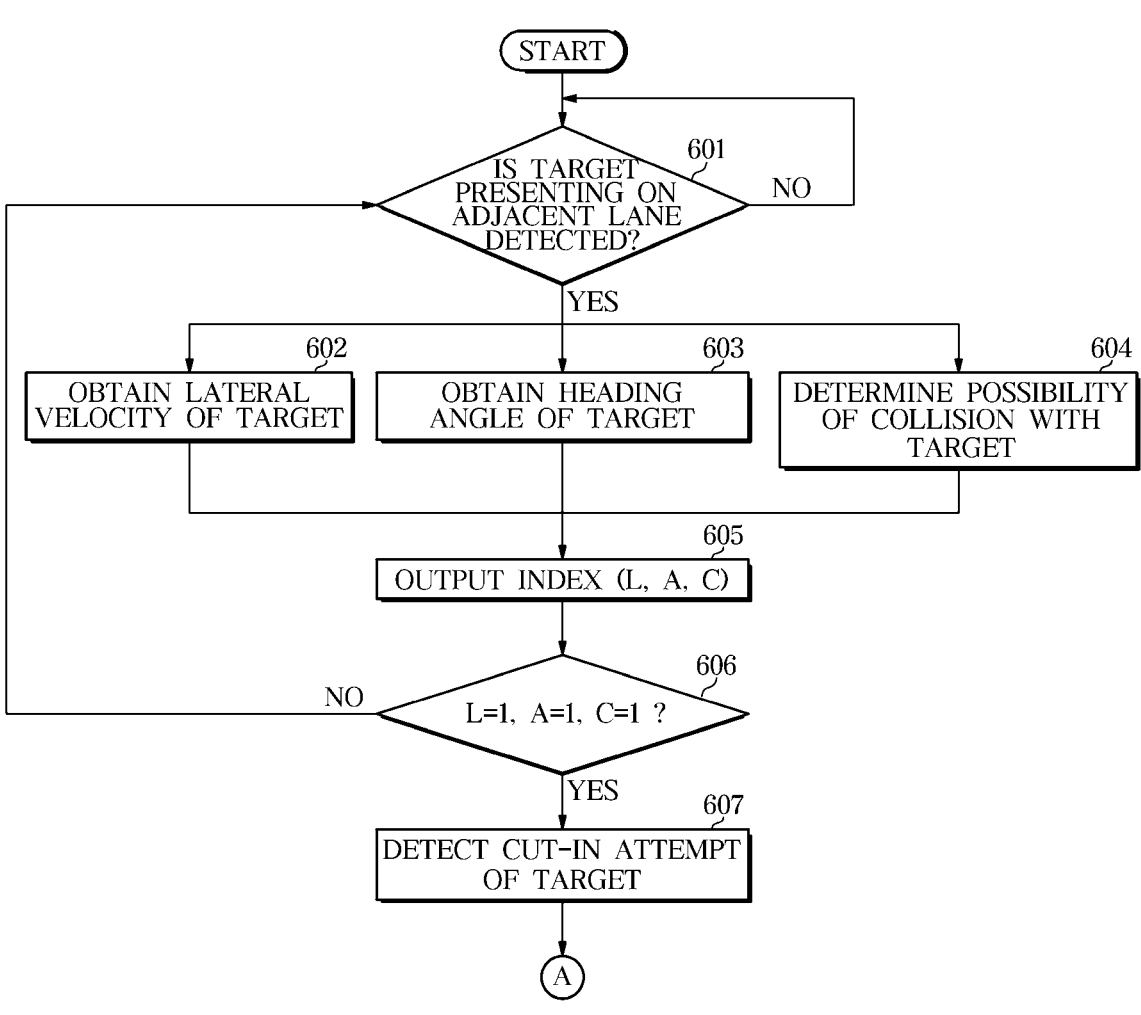
FIG. 6 is a flowchart of a method for controlling a vehicle according to an exemplary embodiment of the present disclosure.

FIG. 6 is a flowchart of a method for controlling a vehicle according to an exemplary embodiment of the present disclosure.

The controller 150 detects the target 2 traveling on the lane adjacent to the lane on which the vehicle 1 is traveling (601). The controller 150 receives image data and/or radar data from the camera 110 and/or the radar 120, and detects the target 2 which may attempt to cut in from an adjacent lane.

The controller 150 obtains the lateral velocity of the target 2, the heading angle of the target 2, and the possibility of collision of the vehicle with the target 2 (602 to 604). These operations 602 to 604 are processes for determining the output values for the first index to the third index, and may be obtained by processing the image data and/or radar data received from the camera 110 and/or the radar 120.

The controller 150 outputs the index (605). The output values related to the first index L, the second index A, and the third index C are output. The output value for the first index L is based on the lateral velocity of the target 2, the output value for the second index A is based on the heading angle of the target 2, and the output value for the third index C is based on the probability of collision with the target 2.

As described with reference to FIG. 3, the output value of the first index L is output as 1 if there is a possibility that the target 2 may cut in the lane on which the vehicle 1 is traveling, and 0 otherwise.

As described with reference to FIG. 4, the output value of the second index A is output as 1 if there is a possibility that the target 2 may cut in the lane on which the vehicle 1 is traveling, and 0 otherwise.

As described with reference to FIG. 5, the output value of the third index C is output as 1 if there is a possibility that the target 2 may cut in the lane on which the vehicle 1 is traveling, and 0 otherwise.

The controller 150 obtains the output values related to the first index L, the second index A, and the third index C, and when all the output values correspond to 1 (606), determines the cut-in attempt of the target 2 (607). This is because, as described above, if all the output values of the first index L, the second index A and the third index C are 1, the probability that the target 2 will attempt to cut in is very high.

Through the above determination processes, the target 2 that attempts to cut in is determined, and the target 2 is determined as a reference for a control target. After determining the target 2 as the reference for the control target, the controller 150 may adjust an avoidance control timing to prevent collision due to the cut-in of the target 2. The process of adjusting the avoidance control timing will be described later.

On the other hand, it is assumed that a plurality of targets 2 exist in an adjacent lane of the vehicle 1. In the instant case, it is reasonable to designate the target 2 including the highest possibility of cut-in as the control target. Accordingly, the controller 150 determines the first index L, the second index A, and the third index C for the plurality of targets 2, respectively, and may determine the target 2 to which all 1 is output as the control target, or determine the target 2 to which 1 is output the most as a priority as the control target.

The controller 150 according to an exemplary embodiment of the present disclosure may detect the plurality of targets in the lanes adjacent to the vehicle 1, obtain first indexes, second indexes and third indexes for the plurality of targets, and determine, as an object of interest, a vehicle having a large number corresponding to a predetermined output value in the first index, the second index and the third index.

Figure 7:
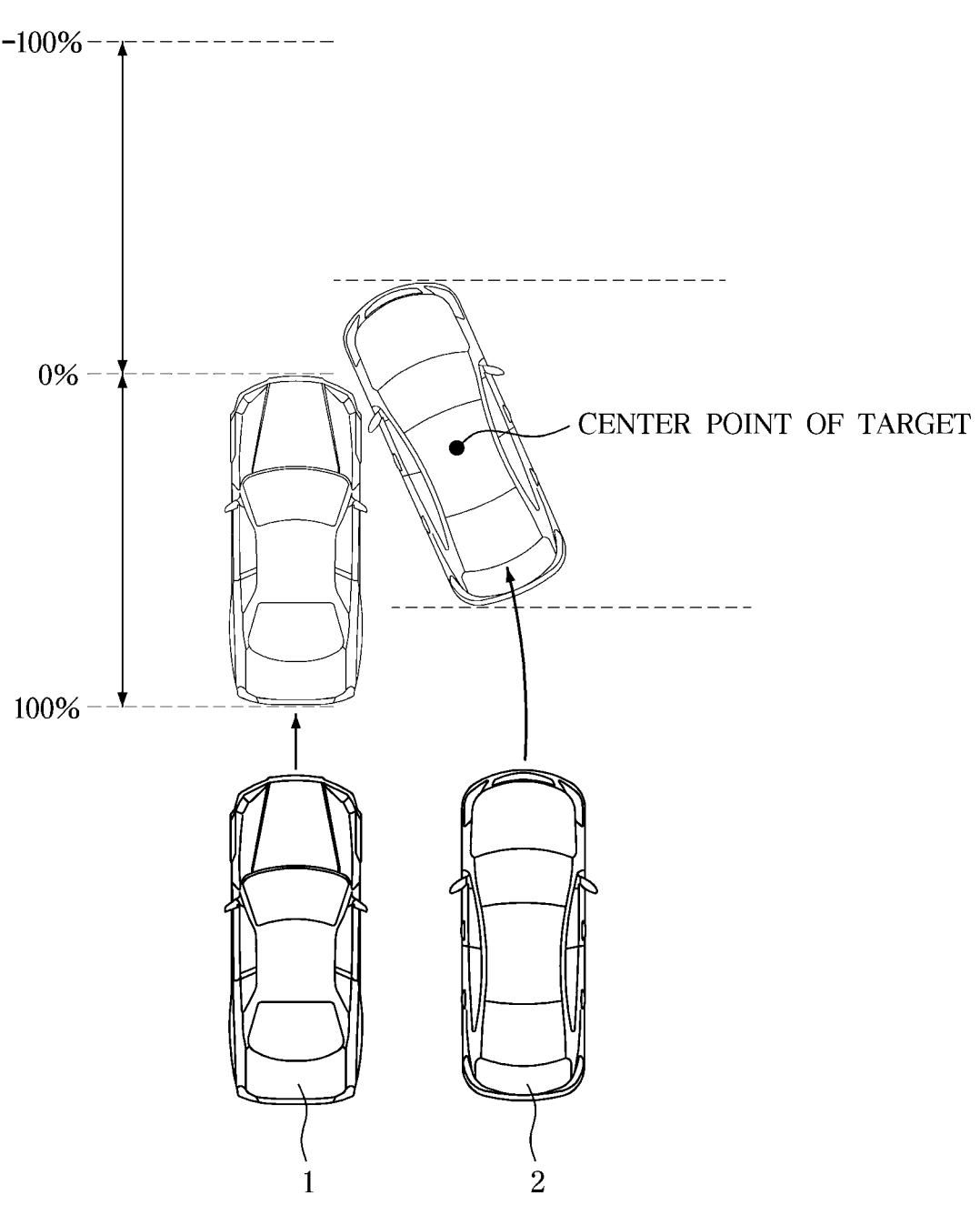
FIG. 7 is a view for describing a collision prediction point between a vehicle according to an exemplary embodiment of the present disclosure and the target.

FIG. 7 is a view for describing a collision prediction point between a vehicle according to an exemplary embodiment of the present disclosure and the target.

According to an exemplary embodiment of the present disclosure, the output values of the above-described indexes are obtained, the collision prediction point is determined after determining the control target based on the obtained output values, the avoidance control timing may be determined based on the determined collision prediction point.

Referring to FIG. 7, assuming that the vehicle 1 collides with the target 2, the controller 150, in the collision state, sets a section equal to the overall length of the vehicle in the front direction and the rear direction based in front of the vehicle 1. At the instant time, with the front of the vehicle as a starting point, the section may be divided into a first section which is 0% (the front of vehicle) to +100% (the rear of vehicle) and a second section that 0% (the front of vehicle) to −100% (a extended point by the overall length of vehicle).

In the instant case, the collision prediction point is defined as a position of the center point of the target with respect to the section. Hereinafter, a process of adjusting the avoidance control timing based on the collision prediction point with reference to FIG. 8 will be described.

Figure 8:
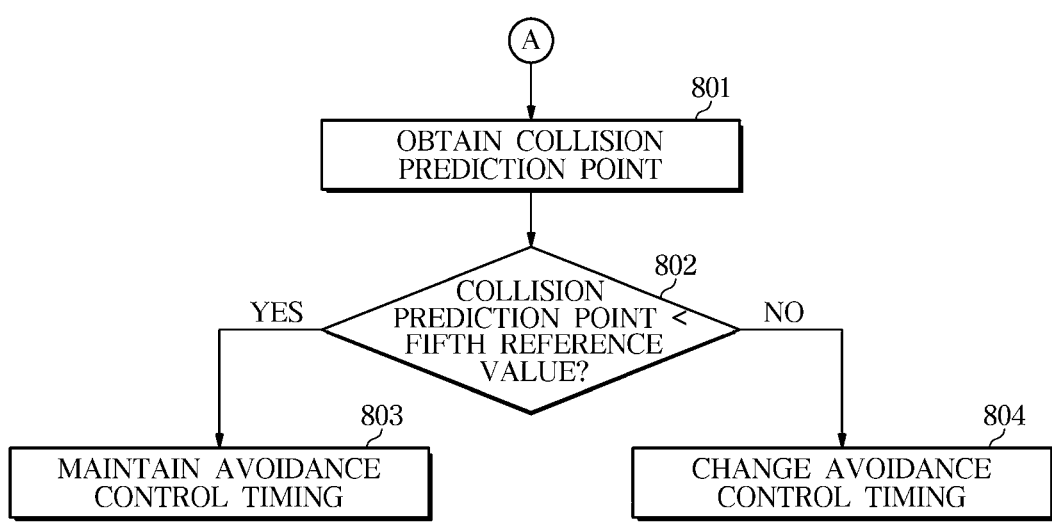
FIG. 8 is a flowchart of a method for controlling a vehicle according to an exemplary embodiment of the present disclosure.
Figure 9:
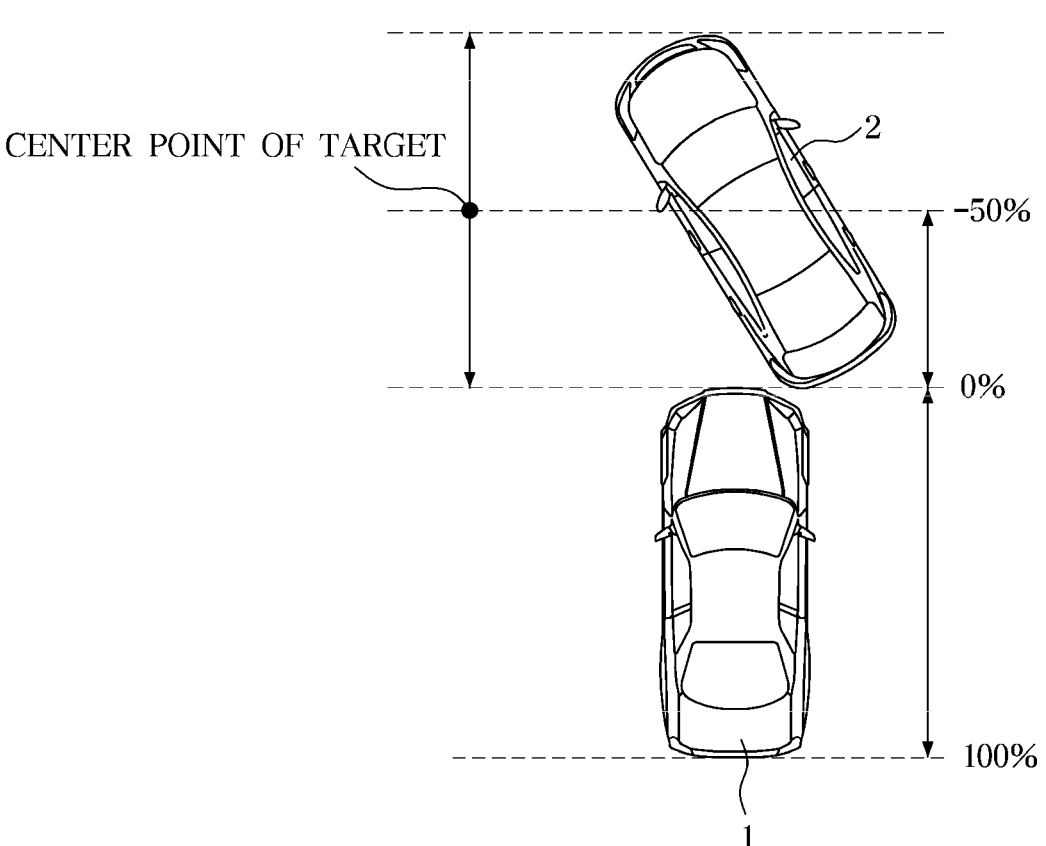
FIG. 9 shows an example of an avoidance control timing according to the collision prediction point.
Figure 10:
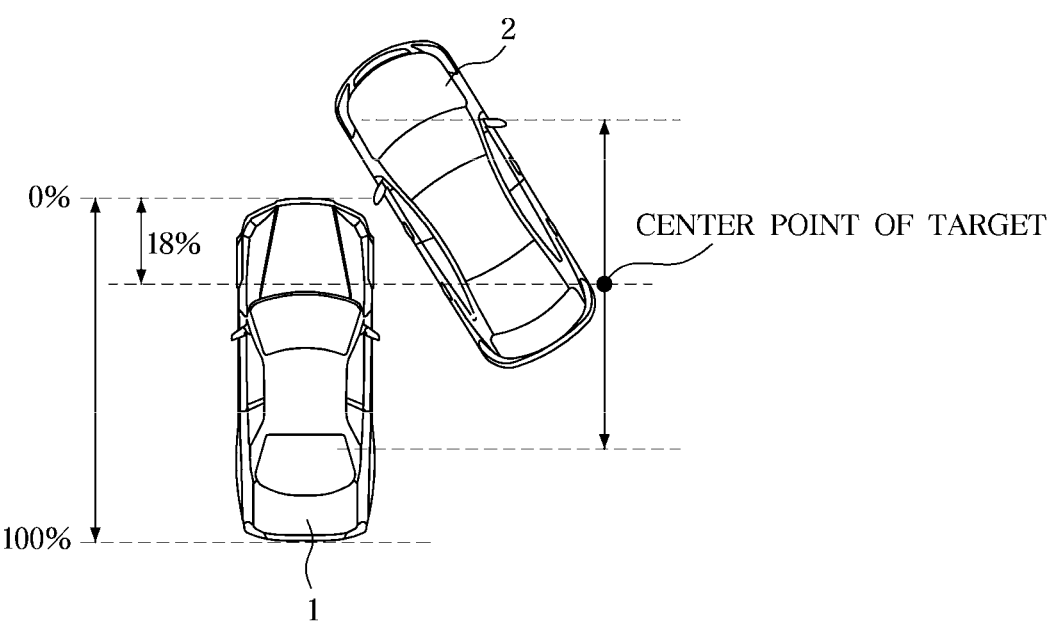
FIG. 10 shows another example of an avoidance control timing according to the collision prediction point.

FIG. 8 is a flowchart of a method of controlling a vehicle according to an exemplary embodiment of the present disclosure, FIG. 9 shows an example of the avoidance control timing according to the collision prediction point, and FIG. 10 shows another example of the avoidance control timing according to the collision prediction point.

The controller 150 obtains the collision prediction point (801).

The controller 150 compares the collision prediction point with a fifth reference value (802), maintains the avoidance control timing when the collision prediction point is less than or equal to the fifth reference value (803), and changes the avoidance control timing when the collision prediction point exceeds the fifth reference value (804). In the instant case, the fifth reference value corresponds to a value which may be changed according to a speed of the vehicle 1.

A detailed description of the range of the fifth reference value and the avoidance control timing will be described in more detail with reference to FIGS. 9 to 10.

Referring to FIG. 9, the vehicle 1 is expected to collide with the rear side of the target 2. At the instant time, the collision prediction point belongs to the second section and is at about −50%. For example, if the fifth reference value is set to 0 and the collision prediction point has a value less than or equal to 0, the controller 150 predicts the rear collision of the target 2 and performs the avoidance control timing as it is in conventional avoidance control, preventing the collision with the rear of target 2.

Referring to FIG. 10, the vehicle 1 is expected to collide with the side of the target 2. At the instant time, the collision prediction point belongs to the first section and is at about 18%. For example, if the fifth reference value is set to 0 and the collision prediction point has a value greater than 0, the controller 150 predicts the side collision of the target 2 and performs avoidance control faster than the conventional control timing, preventing the collision with the side of target 2.

Meanwhile, although the fifth reference value is used as the example above, the fifth reference value may be a section having a predetermined range rather than a specific value.

The controller 150 according to various exemplary embodiments of the present disclosure may obtain the collision prediction point which is the center point of the target 2 based on the overall length of the vehicle 1, and adjust the avoidance control timing according to the location of the collision prediction point. At the instant time, the controller 150 may maintain the conventional avoidance control timing if the collision prediction point falls within the overall length in the forward direction with respect to the front of the vehicle 1, and advance the conventional avoidance control timing if the collision prediction point falls within the overall length in the backward direction with respect to the front of the vehicle 1.

Figure 11:
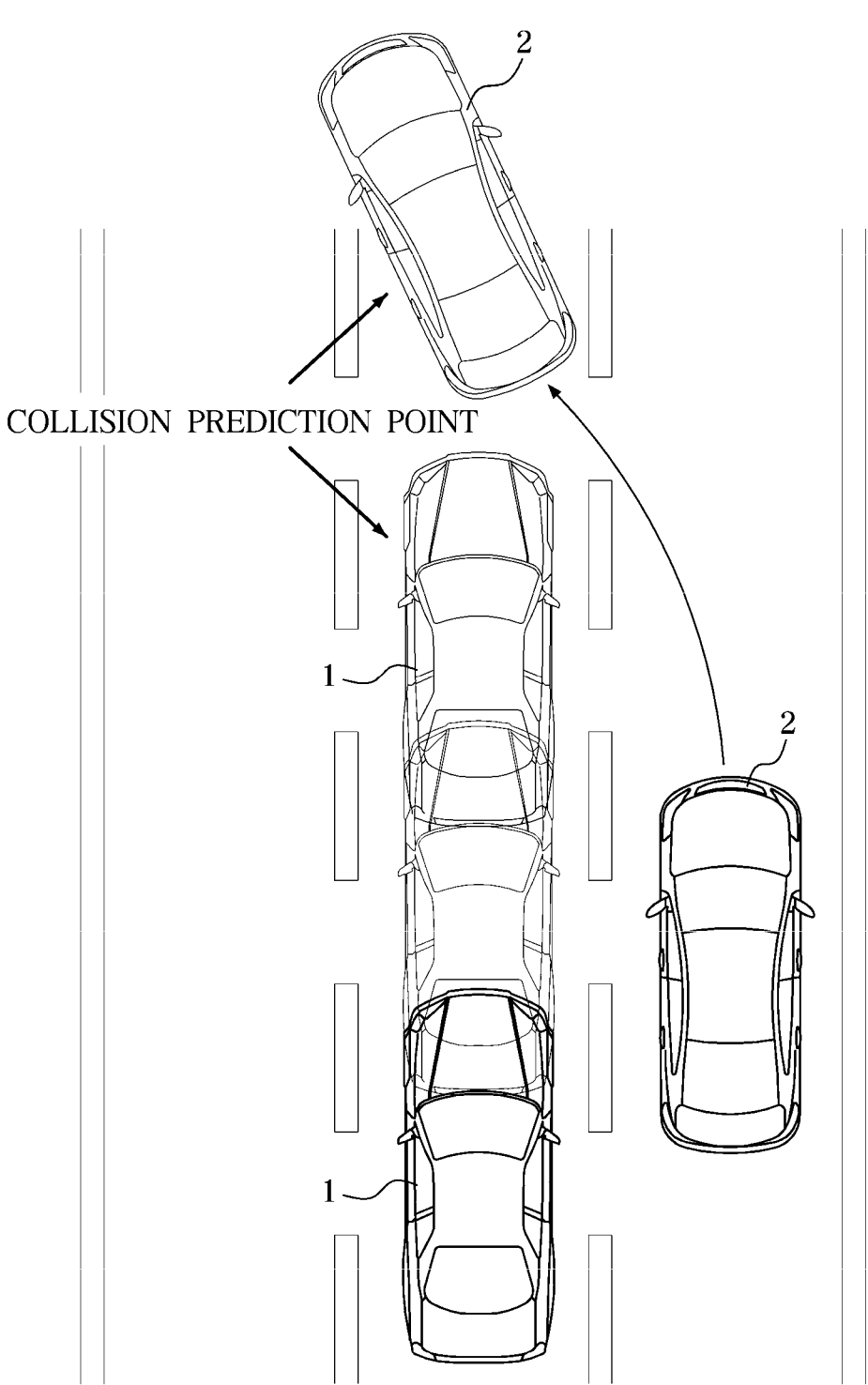

FIG. 11 and FIG. 12 show examples in which the avoidance control timing is maintained.

The situation according to FIG. 11 illustrates a case where the target 2 running side by side on a general road attempts to cut in. At the instant time, referring to FIG. 12, the output values for the first index to the third index are output as 1, and the collision prediction point I belongs to the second section to be classified as CASE 1. Meanwhile, it should be understood that even on the general road according to FIG. 11, the collision prediction point belongs to the first section, so that the control timing may be advanced.

Figure 13:
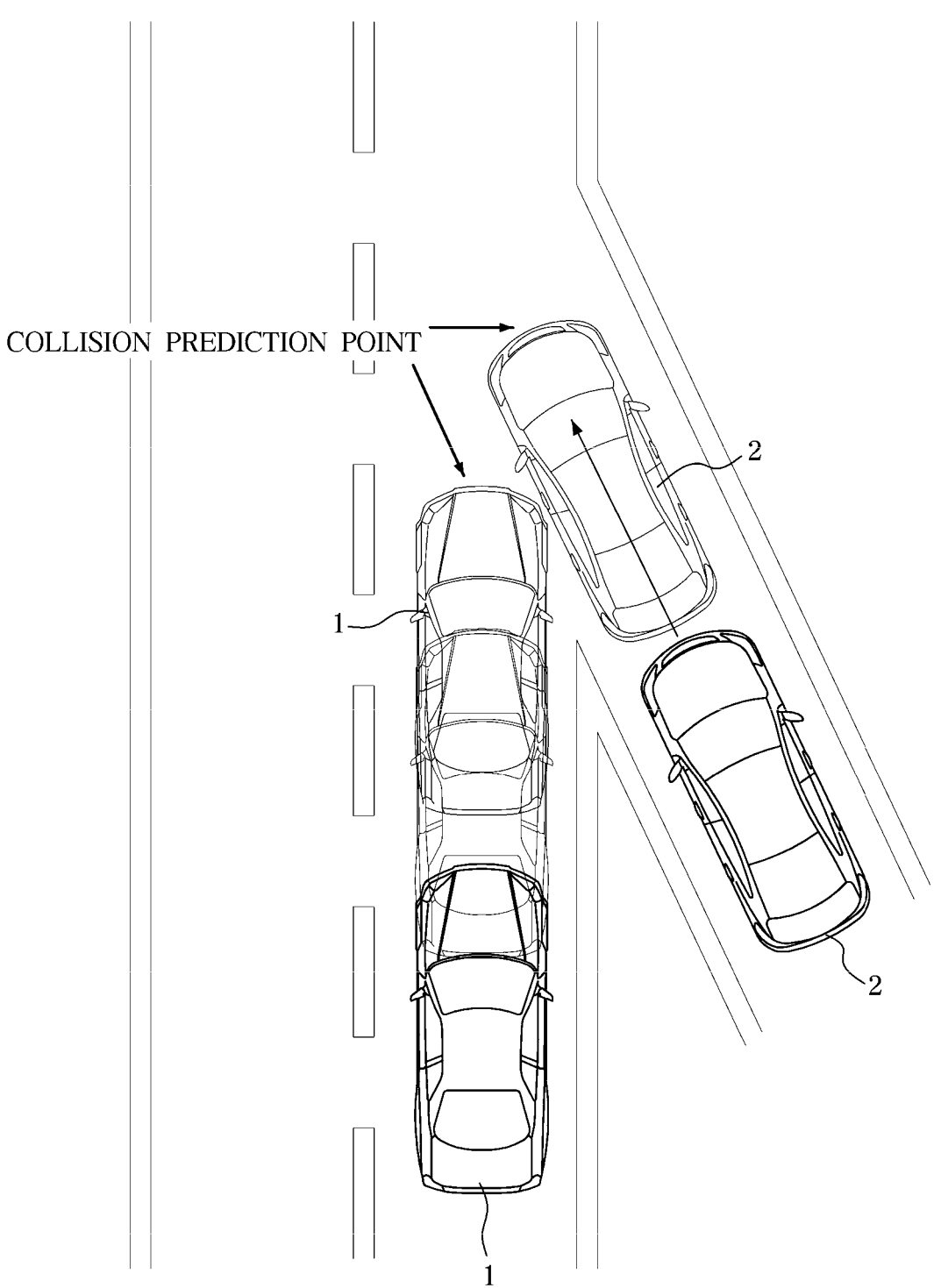

FIG. 13 and FIG. 14 show examples in which the avoidance control timing is changed.

FIG. 13 illustrates a merging section with a high probability of the side collision with respect to the target 2. In the instant case, faster determination and control than the conventional avoidance control is required. Referring to FIG. 14, the output values for the first index to the third index are output as 1, and the collision prediction point I belongs to the first section to be classified as CASE 2. Meanwhile, it should be understood that even in the merging section according to FIG. 12, the collision prediction point belongs to the second section, so that the control timing may be maintained.

As is apparent from the above, the exemplary embodiments of the present disclosure may accurately cope with various types of cut-in in which the conventional driving assistance system may not cope with. Accordingly, it is possible to implement a robust driver assistance system without being sensitive.

On the other hand, the above-described embodiments may be implemented in a form of a recording medium storing commands executable by a computer. The commands may be stored in a form of program code. When the commands are executed by a processor, a program module is generated by the commands so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
a camera disposed on the vehicle to have an external field of view of the vehicle and configured to obtain image data for detecting a target in the external field of view;
a radar disposed on the vehicle to have an external field of view of the vehicle and configured to obtain radar data for detecting the target in the external field of view; and
a controller electrically connected to the camera and the radar and including at least one processor configured to process the image data and the radar data, and controlling at least one of a braking device and a steering device of the vehicle based on a result of the processing;
wherein the controller is further configured to:
detect the target in a lane adjacent to the vehicle;
obtain a first index based on a lateral velocity of the target, a second index based on a heading angle of the target, and a third index based on a possibility of collision of the vehicle with the target, wherein the first index is determined as a predetermined output value when a magnitude of the lateral velocity of the target is equal to or greater than a first reference value, and
when each of the first index, the second index and the third index corresponds to a predetermined output value, determine a cut-in attempt of the target, and control at least one of the braking device and the steering device for adjusting an avoidance control timing for the target, and
obtain a collision prediction point which is a center point of the target based on an overall length of the vehicle,
when a longitudinal distance between a specific point of a front of the vehicle and the collision prediction point is equal to or less than the overall length of the vehicle, maintain the avoidance control timing when the collision prediction point is located within the overall length in a first direction with respect to the front of the vehicle, and
advance the avoidance control timing when the collision prediction point is located within the overall length in a second direction opposite to the first direction with respect to the front of the vehicle,
wherein the controller is further configured to:
when at least one of a second plurality of corner points at corners of the target crosses a lane on which the vehicle is traveling and a time (TTIS) at which a first plurality of corner points at corners of the vehicle enters a lane on which the target is traveling is equal to or less than a second reference value, determine the third index as the predetermined output value.

2. The vehicle of claim 1, wherein the controller is further configured to:
adjust the avoidance control timing according to a location of the collision prediction point.

3. The vehicle of claim 1, wherein the controller is further configured to:
when the collision prediction point does not belong to the overall length in the first direction and the second direction, determine that there is no cut-in attempt of the target.

4. The vehicle of claim 1, wherein the controller is further configured to:
determine whether a traveling lane of the target is left + or right − with respect to the vehicle, determine whether a lateral velocity direction of the target is left + or right −, and when a value obtained by multiplying the traveling lane of the target and the lateral velocity direction of the target is a negative number, determine the first index as the predetermined output value.

5. The vehicle of claim 1, wherein the controller is further configured to:
determine whether the traveling lane of the target is left + or right − with respect to the vehicle, determine whether a heading angle direction of the target with respect to an extension line toward the front of the vehicle is left − or right +, and when a value obtained by multiplying the traveling lane of the target and the heading angle direction of the target is a positive number, determine the second index as the predetermined output value.

6. The vehicle of claim 1, wherein the controller is further configured to:
when a time (TTIT) at which the second plurality of corner points enters a lane on which the vehicle is traveling is equal to or less than a third reference value, determine the third index as the predetermined output value.

7. The vehicle of claim 6, wherein the controller is further configured to:
when a time to collision (TTC) between the vehicle and the target is equal to or less than a fourth reference value, determine the third index as the predetermined output value.

8. A method of controlling a vehicle, the method comprising:
detecting, by at least one processor, a target in a lane adjacent to the vehicle;
obtaining, by the at least one processor, a first index based on a lateral velocity of the target, a second index based on a heading angle of the target and a third index based on a possibility of collision of the vehicle with the target, wherein the first index is determined as a predetermined output value when a magnitude of the lateral velocity of the target is equal to or greater than a first reference value;

recognizing, by the at least one processor, a cut-in attempt of the target when each of the first index, the second index, and the third index corresponds to a predetermined output value;

controlling, by the at least one processor, at least one of a braking device and a steering device of the vehicle to adjust an avoidance control timing for the target;

obtaining, by the at least one processor, a collision prediction point which is a center point of the target based on an overall length of the vehicle;

when a longitudinal distance between a specific point of a front of the vehicle and the collision prediction point is equal to or less than the overall length of the vehicle, maintaining, by the at least one processor, the avoidance control timing when the collision prediction point is located within the overall length in a first direction with respect to a front of the vehicle; and advancing, by the at least one processor, the avoidance control timing when the collision prediction point is located within the overall length in a second direction opposite to the first direction with respect to the front of the vehicle, wherein obtaining the third index based on the possibility of collision of the vehicle with the target further includes:

when at least one of a second plurality of corner points at corners of the target crosses a lane on which the vehicle is traveling and a time (TTIS) at which a first plurality of corner points at corners of the vehicle enters a lane on which the target is traveling is equal to or less than a second reference value, determining, by the at least one processor, the third index as the predetermined output value.

9. The method of claim 8, further includes:

adjusting, by the at least one processor, the avoidance control timing according to a location of the collision prediction point.

10. The method of claim 8, wherein obtaining the first index based on the lateral velocity of the target further includes:

determining, by the at least one processor, whether a traveling lane of the target is left + or right − with respect to the vehicle, determining whether a lateral velocity direction of the target is left + or right −, and when a value obtained by multiplying the traveling lane of the target and the lateral velocity direction of the target is a negative number, determining the first index as the predetermined output value.

11. The method of claim 8, wherein obtaining the second index based on the heading angle of the target further includes:

determining, by the at least one processor, whether the traveling lane of the target is left + or right − with respect to the vehicle, determining, by the at least one processor, whether a heading angle direction of the target with respect to an extension line toward the front of the vehicle is left − or right +, and when a value obtained by multiplying the traveling lane of the target and the heading angle direction of the target is a positive number, determining, by the at least one processor, the second index as the predetermined output value.

12. The method of claim 8, wherein obtaining the third index based on the possibility of collision of the vehicle with the target further includes:

when a time (TTIT) at which the second plurality of corner points enters a lane on which the vehicle is traveling is equal to or less than a third reference value, determining, by the at least one processor, the third index as the predetermined output value.

13. The method of claim 12, wherein obtaining the third index based on the possibility of collision of the vehicle with the target further includes:

when a time to collision (TTC) between the vehicle and the target is equal to or less than a fourth reference value, determining, by the at least one processor, the third index as the predetermined output value.

14. The method of claim 8, further includes:

when the collision prediction point does not belong to the overall length in the first direction and the second direction, determining, by the at least one processor, that there is no cut-in attempt of the target.

* * * * *